United States Patent
Paschall

[11] 3,868,727
[45] Mar. 4, 1975

[54] WELDING HOOD

[76] Inventor: James W. Paschall, 440 Garden St., Golden, Colo. 80401

[22] Filed: Sept. 24, 1973

[21] Appl. No.: 399,900

[52] U.S. Cl. .............................................. 2/8, 2/12
[51] Int. Cl. .............................................. A61f 9/06
[58] Field of Search ............................... 2/8, 9, 10

[56] References Cited
UNITED STATES PATENTS

| | | | |
|---|---|---|---|
| 1,176,313 | 3/1916 | Pfund | 2/8 X |
| 2,309,599 | 1/1943 | Kinney | 2/8 |
| 2,610,323 | 9/1952 | Johnson | 2/8 |
| 2,978,709 | 4/1961 | Atha | 2/9 |
| 3,112,490 | 12/1963 | Malcom, Jr. | 2/8 |
| 3,254,932 | 6/1966 | Blaney | 2/8 X |

OTHER PUBLICATIONS
Helmet, Welders', and Shield, Welding, Hand Held; Federal Specification GGG-H-211a; Feb. 9, 1955; p. 1, 10 & 11.

Primary Examiner—Werner H. Schroeder
Attorney, Agent, or Firm—C. B. Messenger

[57] ABSTRACT

A welding hood for use during arc welding operations to provide full eye protection when a welding arc is observed through a visually aligned direct viewing area. A face shield of transparent or translucent material supports and surrounds the direct viewing area thereby providing improved peripheral viewing capability for the user. Protection from light of varied intensity and wave length is provided through use of stepped multiple layers or varied thicknesses of shade lens material at positions coordinated with the user's line of sight. Different helmet, face and chin shields and lens helmet support configurations are provided.

12 Claims, 8 Drawing Figures

PATENTED MAR 4 1975 3,868,727
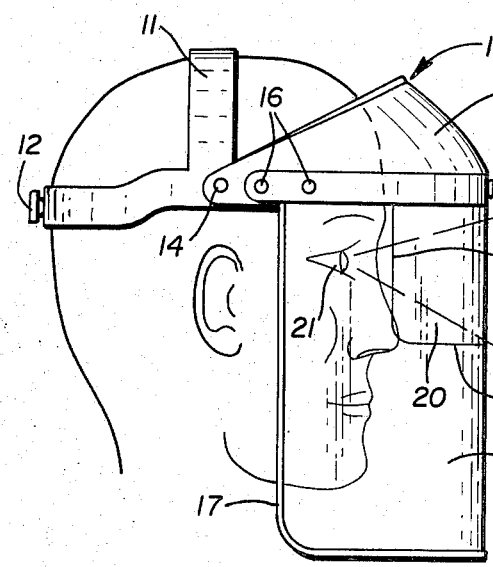
Fig.1
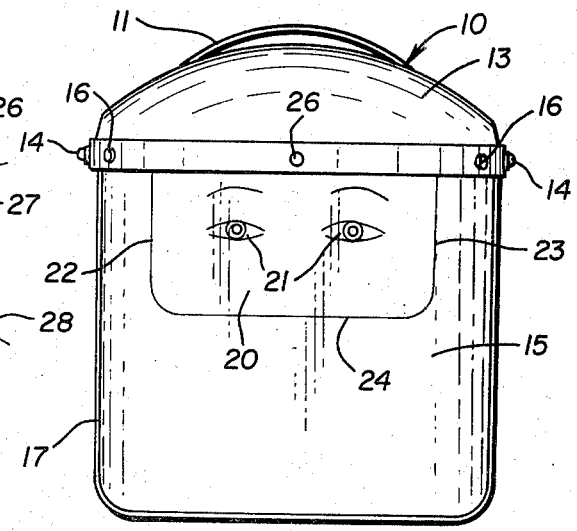
Fig.2
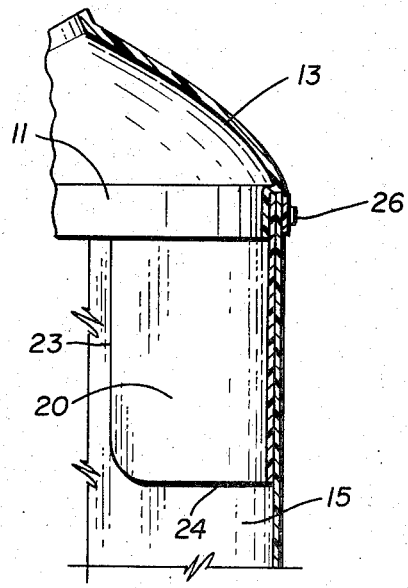
Fig.3
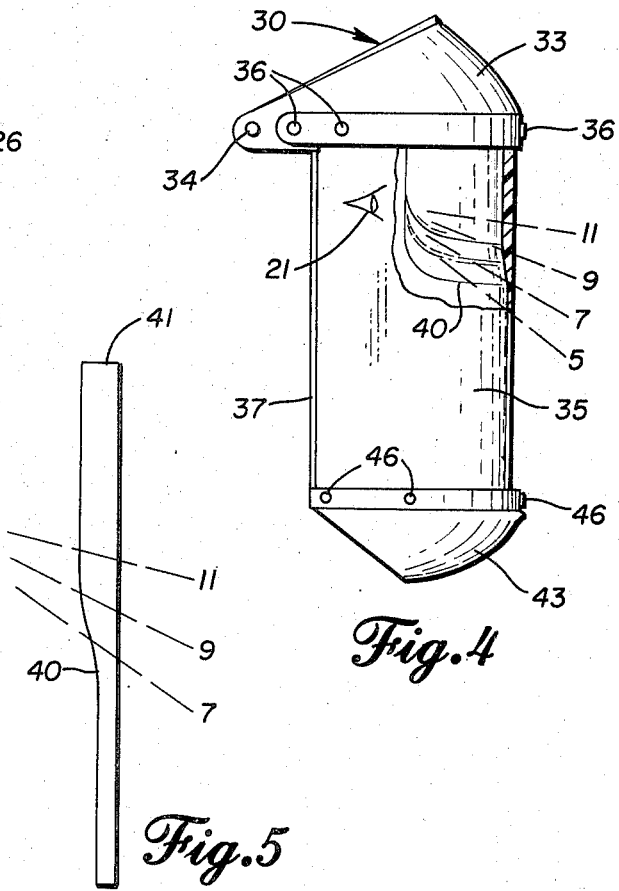
Fig.4
Fig.5

WELDING HOOD

BACKGROUND OF THE INVENTION

At the present time welders engaged in arc welding operations wear a welding hood that usually provides a small sight glass mounted in an opaque helmet surrounding the user's face. The sight glass is disposed in a receptacle positioned in front of the welder's eyes. The sight glasses, which are of relatively small size (2 inches × 4½ inches), may be changed to provide varied transparencies or shade values when different welding operations are undertaken. Applicable national standards recommend lenses or sight glasses having various shade numbers for use with different welding processes that may emit light having different intensity and wave length characteristics. For the usual electric arc welding operations lenses having shade numbers of 7 up to 11 might be used. While variations in the absorptive powers for the lenses are thus available, the present welding hoods have a substantial disadvantage inasmuch as the welder cannot observe objects and operations surrounding his work site. Where the darker lenses are used, it is even difficult to see the point where welding processes are to be applied. Many welding operations are required in connection with shipbuilding, construction and manufacture where the welder will be in a dangerous position or at least at a place where he is exposed to physical injury resulting from his actions or the actions and acts of others. When present welding hoods are in the operative position, the welder has no peripheral vision, and he, accordingly, cannot see and avoid dangerous moving or stationary objects. Where operations are being carried on at elevated positions, the present welding hoods so obscure the welder's direct and peripheral vision that disorientation and vertigo are possible. Hoods in which the shaded lenses may be pivotally moved to an out-of-way position are beneficial, since the entire hood does not then have to be moved to establish direct viewing of the welder's surroundings. Even these hoods, however, have an operational shortcoming, since peripheral vision is still blocked by the opaque structure of the lens support and helmet elements which surround the user's face.

SUMMARY OF THE INVENTION

In order to avoid operational difficulties noted in connection with the use of previous welding hoods, the present inventor provides a face shield for use in connection with arc welding operations wherein the general body of the shield which surrounds the welder's face is made of a transparent or translucent plastic having a shade value that will at least permit the welder to observe his surroundings. Additional layers of shade lens material or additional thicknesses of the same material providing the face shield body are placed at a central position coordinated with the user's direct line of vision in order to increase light and ultraviolet ray absorptive properties at this direct viewing position. When arc welding operations are undertaken, the welder's vision is directed through this area of increased protection to avoid burning of the eyes. At such time the welder will always be able to peripherally observe objects at the side and away from the position for the arc. Accordingly, operations surrounding the welder's work site can be observed, and welding operations can proceed with improved safety. If the general body of the face shield provides protection similar to that now used in connection with oxyacetylene welding or metal cutting operations, the welder will be able to see items that are to be welded or the position where the arc is to be struck by directing his vision through this general body or face shield structure. Just prior to striking the arc the head can be tilted to provide the full protection of the direct viewing area for the shield.

The face shield structure is mounted on a head band pivot support, and it can, accordingly, be tilted to an out-of-use position. Where multiple layers of protective material are used in the direct viewing area, stepped shade lens protection values may be provided. Where the added protection at the direct view area is provided by the same material as the face shield, a tapered or stepped configuration can be used to obtain graduated protection.

BRIEF DESCRIPTION OF THE DRAWINGS

FIG. 1 is a side view showing use of an embodiment of the invention,

FIG. 2 is a front view of the embodiment shown in FIG. 1,

FIG. 3 is an enlarged side view in cross-section,

FIG. 4 is a side view of a modified embodiment shown in partial cross-section,

FIG. 5 is an enlarged side view of the embodiment shown in FIG. 4,

DESCRIPTION OF THE PREFERRED EMBODIMENTS

Figure 6:
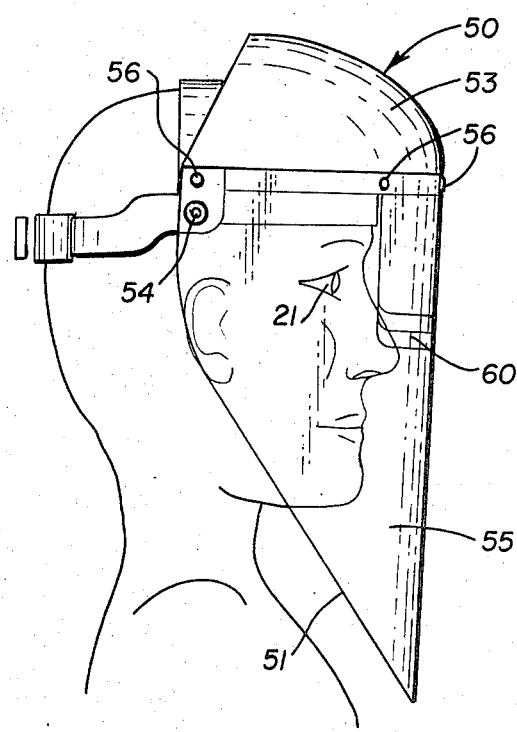
FIG. 6 is a side view of a further embodiment of the invention.

A first embodiment of the invention is shown in FIGS. 1, 2 and 3. The overall advantages, beneficial configuration and utility of the invention is initially presented by such illustrations. In FIG. 1 it is shown that a head band support 11, which may have an adjustment 12 for the accommodation of various head sizes provides support for a visor frame 13 which is movably mounted on the head band 11 by the pivot 14. A face shield 15 which is formed of flat sheet stock made of a transparent or translucent plastic is joined to the visor frame 13 by a plurality of snaps 16. The face shield may be provided with a metal edging 17 to support the shield and keep it from cracking, etc. The face shield may be made of sheet plastic material, which preferably has a green shade color having a light transmittance value corresponding to at least a shade number of 3 under pertinent American National Standards. Preferably the shield should have a shade number of 5. With the proper shade value the welder using the face shield will be able to observe his surroundings, inclusive of moving or stationary objects or people. With a shade value or shade number of 5 the face shield 15 itself will provide adequate protection for oxyacetylene cutting or some oxyacetylene welding operations.

It is desirable that the structure described be additionally useful in connection with electric arc and resistance welding operations. In order to provide a welding hood for such uses the hood 10 shown in FIGS. 1-3 provides a curved filter plate 20 at a position disposed in front of the user's eyes 21. The curved filter plate 20 is usually disposed within the face shield 15, and it may be supported in the desired position by a snap lock 26 which holds the face shield 15 and filter plate 20 to the visor frame 13. The filter plate may be formed from sheet plastic materials that could be of the same material and same shade value as the face shield itself. Acetate or polycarbonate plastics may be used to provide this lens type structure 20. Additionally, hardened glass can be used. When a filter plaste is applied to the interior or to the exterior of the face shield 15, the resultant total shade value for the face shield 15 and filter plate 20 in combination should have a value of from 7 to 11 or greater as required by the arc welding operations to be undertaken.

The positioning and size of the lens filter plate 20 should be substantially as indicated in FIGS. 1 and 2. When in use, the side edges 22 and 23 should be disposed apart a chord distance corresponding to the width of the user's head. The upper edge is positioned to provide vision along a slight incline as indicated by the line 27. The lower edge 24 provides protection for a line of vision 28 directed from the user's eyes downwardly at a greater angle so that good protection will be provided in the normal work positions for welding operations. An operative size and configuration is provided when the lower edge 24 is positioned at a height corresponding with the tip of the user's nose. Since people usually tilt their heads to observe objects at positions that will be unobstructed by the nose, the described positioning provides protection for all usual work attitudes and positions.

Features of a second embodiment of the invention are shown in FIGS. 4 and 5. Here components of only the modified welding hood 30 are shown. For this welding hood 30 a head band support 11 of the type previously described can also be provided to pivotally support the visor frame 33 for movement about its pivot mount 34. The face shield 35 is of molded plastic materials, and it is joined to the visor support 33 by the snaps 36. An auxiliary chin and lower face protecting structure 43 is provided which may be of the same molded shape as visor frame 33. This protector which is joined to the face shield 35 by snaps 46 is preferably made of an opaque material. The chin protector 43 and the visor frame 33 may be mold formed from plastic materials, such as polycarbonate or thermoplastics PTMT (polyterephtholate), etc. Materials of this type can provide substantial abrasive resistance and strength to assure protection for the user and to hold the face shields 15 and 35 in secure and accurate position.

The face shield 35 for this embodiment of the invention is preferably of molded construction in order to provide a tapering cross-section for the view area 40 disposed in front of the user's eye 21. A beneficial shape for this view area is shown in larger cross-section at FIG. 5. Lens or filter plate section 40 has a varied thickness downwardly from its position of attachment to the face shield 35 by the snaps 36. Along a view line identified by the number 11 the lens or filter plate 40 has a thickness, color and composition providing protection for the welder's eyes that will compare to a standard shade number value of 11. At a lower view line 9 protection having a shade number value of 9 is provided. Below this point at the view line 7 the thickness for the shield 35 thins to provide eye protection corresponding to a shade number of 7. As in the previous embodiment, the main body of the shield 35 may provide protection corresponding to lower values, such as a shade number of 5. Where graduated protection is provided by the tapered cross-section along the lower edge of the view area 40, the welder can tilt his head and the hood 30 to vary the eye protection that is used. This feature is especially beneficial where heavy welding operations are undertaken. The welding electrode can be prepositioned by visual observation through the face shield body (shade number 5), and subsequently the user's head may be tilted as the electrode is moved toward the position for striking an arc to increase the resultant eye protection to a value of 7 or 9. Once the weld has been started the hood is tilted further to provide the full protection of the greatest thickness and highest shade number value. Since different electrodes and welding current will provide arcs of varying intensity, the varied protection provided by view area 40 can be quite beneficial.

Figure 7:
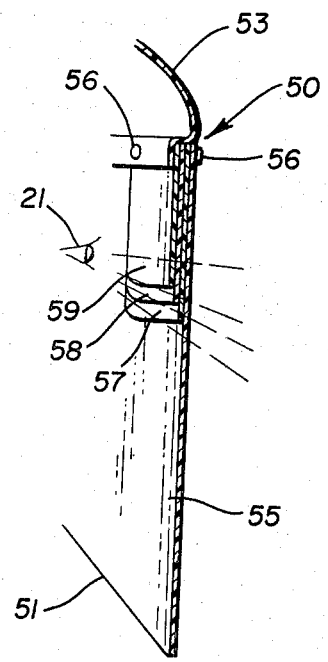
FIG. 7 is an enlarged side view in cross-section of the FIG. 6 embodiment.

A third embodiment of the invention is shown in FIGS. 6 and 7. In these illustrations the welding hood 50 has a face shield 55 that is of different configuration to extend lower and, accordingly, to provide improved protection for the welder's chin and neck. The curvature for the lower edge 51 conforms in part with the shape of the welder's body so that infrared and ultraviolet rays from the welding arc will not be passed to the welder's neck. In this embodiment of the invention the visor frame 53 is again attached to a head band that is similar to the head band previously described. Pivot support for the face shield 55 is provided by a pivot 54 which is beneficially disposed at a slightly lowered elevation. With this hood construction a plurality of layers of protective materials are disposed in the view area 60 so that varied shade protection is available. If three separate layers of protective material are used at the filter plate area, welding hood 50 can provide protection of value corresponding to shade numbers of 5, 7, 9 and 11, as indicated, or any other combination of shade values that may be desired. Any of the filter plate shade elements 57, 58 or 59 provided in the view area may be changed, and, accordingly, additional elements may be added or removed from the interior of the face shield 55 when the snap fasteners 56 are released.

Figure 8:
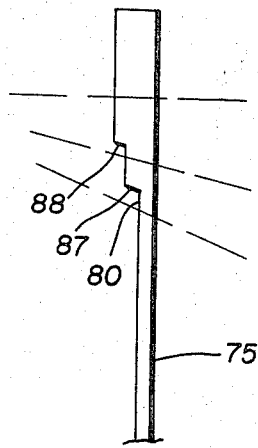
FIG. 8 is an enlarged side view of a lens structure for a fourth embodiment of the invention.

A further embodiment of the invention is shown schematically in FIG. 8, where a face shield 75 that is molded provides a view protective area 80 having segments of varied thickness and protection disposed in a stepped pattern. Step lines 87 and 88 characterize this construction in place of the tapered configuration shown and described in FIG. 5. With the stepped configuration and with the transition angle between steps corresponding to natural angles of view for the user, aberations and distortions are avoided that might otherwise be troublesome.

For all of the embodiments of the invention shown the user is provided a welding helmet having an area of direct view that can provide protection adequate for electric arc operations. This area of increased protection is surrounded and supported by a face shield that is itself of a transparent or translucent construction. Accordingly, with welding hoods made as set forth the user's peripheral vision is not blocked by the welding helmet, and he will still be able to see and avoid moving or stationary objects that could otherwise be hazardous. This peripheral vision capability is preserved and, in fact, improved by the glow and increased lighting during arc welding operations. The peripheral viewing capabilities are especially beneficial from the safety standpoint when welding operations are to be undertaken at high elevations or at otherwise hazardous positions.

Where the face shield itself is made of light shading types of eye protective material, the main portions of the face shield away from the area of direct view can be used during oxyacetylene cutting and welding operations. The varied shade levels of eye protection provided along alternate view lines by the filter plates make it possible for the welder to safely use a single helmet when light, medium or heavy electric arc welding operations are to be undertaken.

In all instances in the foregoing description and in the claims following where shade numbers are indicted, the shade number and light values referred to are in accordance with applicable national standards as set forth by the American Standards Institute, Inc. of 1430 Broadway, New York City, 10018, in Standard No. Z87.1-1968. The referenced standard provides light transmittance and absorption values for both infrared and ultraviolet and violet light with specific value ranges being set forth in such standard for optical density and luminescence transmittance values.

I claim:

1. A welding helmet for use during electric and gas welding operations comprising a head band for engagement on the user's head to provide support for the helmet, a face shield component mounted on said head band support for positioning to protect the user's face, a supplementary filter plate of lesser size than said shield engaged on said helmet for disposition forwardly of the user's eyes in a direct viewing area for electric welding operations to be undertaken, said face shield being of a shaded translucent material providing luminosity, infrared and ultraviolet transmittance characteristics corresponding to a shade number of at least 3 for the protection of the user's eyes during gas welding operations and for protecting the user's face from flash burns during electric welding operations, and said filter plate being of shaded translucent material providing together with said face shield a total increased eye protection whereby the desired electric welding operations may be undertaken without damage to the user's vision.

2. The welding helmet of claim 1 wherein said filter plate is of a width corresponding to the width of the user's head and further comprising a pivotal mounting operatively intermediate said head band and filter plate whereby the filter plate is movable to alternate positions in front of or away from the direct viewing area of the user.

3. The welding helmet of claim 2 wherein said pivot mounting is operatively positioned between the head band and the face shield and wherein said filter plates and face shield are conjointly moved to alternate operative and out-of-the-way positions.

4. The welding helmet of claim 3 wherein said filter plate is positioned on said face shield and further comprising selective attachment means facilitating the installation and removal of said filter plate.

5. The welding helmet of claim 4 and further comprising a plurality of filter plates for separate and conjoint usage with said face shield to provide total increased eye protection of varied luminosity, infrared and ultraviolet transmittance values.

6. The welding helmet of claim 1 and further comprising a plurality of filter plates of width corresponding to the width of the user's head for separate and conjoint usage with said face shield to provide total increased eye protection of varied luminosity, infrared and ultraviolet transmittance values.

7. The welding helmet as set forth in claim 6 wherein a plurality of filter plates are provided with the filter plates being of varied size to cover direct viewing areas of changed size whereby the total shade number value available for the direct viewing of electric welding operations is changed for direct viewing zones of varied shape.

8. The welding helmet as set forth in claim 6 wherein said face shield and filter plates are all formed of the same material having identical shade number values with increased protection being provided by multiple layers thereof.

9. The welding helmet as set forth in claim 6 wherein the face shield and filter plate components are of the same material and of molded shape providing increased thickness and, accordingly, reduced transmittance at a defined filter plate area.

10. The welding helmet of claim 9 wherein a tapered transition is provided between the face shield and the filter plate area of maximum thickness.

11. The welding helmet of claim 9 wherein a stepped transition is provided between the face shield and the filter plate area.

12. The welding helmet of claim 11 wherein a plurality of stepped transitions are provided and wherein the surfaces defining said stepped transitions are aligned with the user's angle of viewing.

* * * * *